United States Patent [19]

Colvin et al.

[11] Patent Number: 5,030,501
[45] Date of Patent: Jul. 9, 1991

[54] CUSHIONING STRUCTURE

[75] Inventors: David P. Colvin, Apex; Craig S. Potter, Raleigh, both of N.C.

[73] Assignee: Raven Marketing, Inc., Westerville, Ohio

[21] Appl. No.: 359,105

[22] Filed: May 31, 1989

[51] Int. Cl.⁵ .............................................. B32B 3/30
[52] U.S. Cl. ......................................... 428/178; 5/449; 5/451; 5/453; 5/455; 206/522; 428/71; 428/72; 428/119; 428/166; 428/180
[58] Field of Search .................. 428/72, 178, 166, 180, 428/119; 206/522; 5/449, 451, 453, 455

[56] References Cited

U.S. PATENT DOCUMENTS

| | | | |
|---|---|---|---|
| 2,028,060 | 1/1936 | Gilbert | 428/178 |
| 2,275,575 | 3/1942 | Vrooman | 428/178 |
| 2,575,764 | 11/1951 | Morner | 428/178 |
| 2,874,826 | 2/1959 | Matthews et al. | 206/522 |
| 3,142,599 | 7/1964 | Chavannes | 206/522 |
| 3,294,387 | 12/1966 | Chavannes | 5/455 |
| 3,549,201 | 12/1970 | Wolfe | 5/449 |
| 3,746,605 | 7/1983 | Dillon | 156/145 |
| 3,885,074 | 5/1975 | Chandler | 428/200 |
| 3,900,356 | 8/1975 | Koch et al. | 156/145 |
| 4,096,306 | 6/1978 | Larson | 428/166 |
| 4,287,250 | 9/1981 | Rudy | 206/522 |
| 4,422,194 | 12/1983 | Viesturs et al. | 5/451 |
| 4,427,474 | 1/1984 | Ottaviano | 428/166 |
| 4,495,237 | 1/1985 | Patterson | 428/71 |
| 4,533,583 | 8/1985 | May | 428/72 |
| 4,551,379 | 11/1985 | Kerr | 206/522 |
| 4,864,671 | 9/1989 | Evans | 5/455 |
| 4,869,939 | 9/1989 | Santo | 428/178 |

FOREIGN PATENT DOCUMENTS 750096  1/1967  Canada .
1161676 6/1985  U.S.S.R. .

Primary Examiner—Ellis P. Robinson
Assistant Examiner—Archene A. Turner
Attorney, Agent, or Firm—Watkins, Dunbar Pollick

[57] ABSTRACT

A cushioning structure for dampening shocks useful as a packing material to protect shipments of goods and as a protective shield or garment to prevent injury from falls including one or more planar sheets of pliable material bonded to a matrix of polygon shape cells containing a fluid such as air or other gas. In one aspect the cells are in fluid communication with each other to provide a valved fluid transfer from one cell to the next.

6 Claims, 5 Drawing Sheets

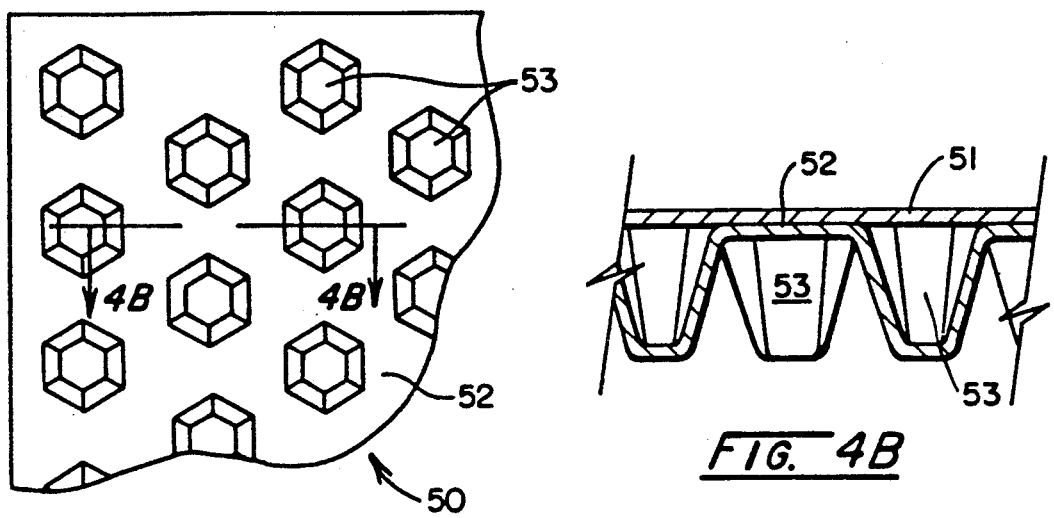
FIG. 4A
FIG. 4B
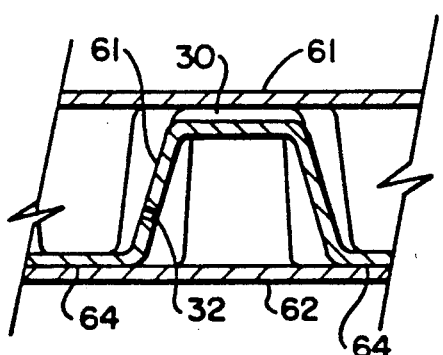
FIG. 5
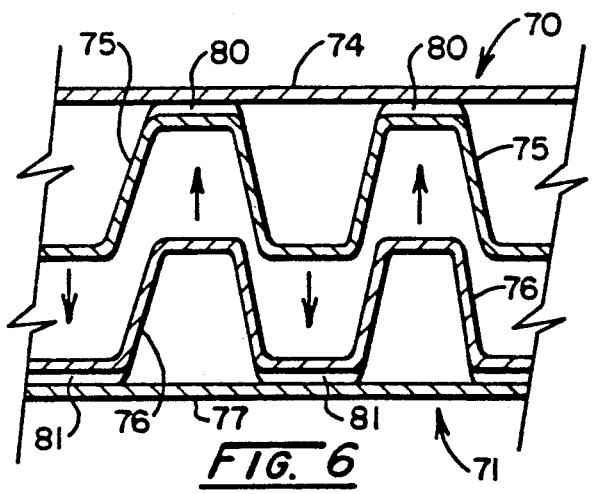
FIG. 6
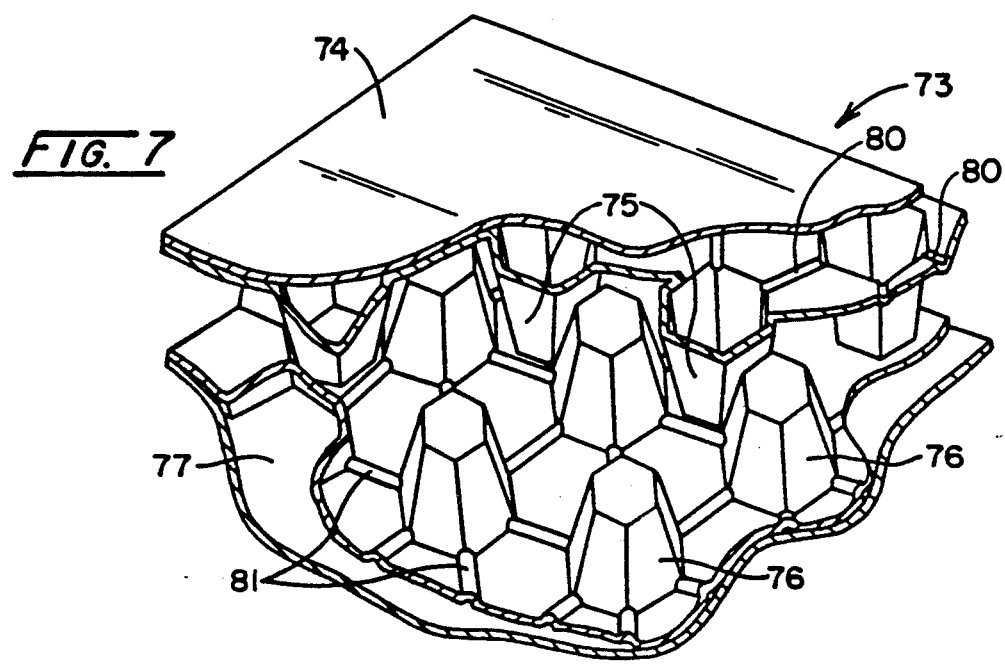
FIG. 7

CUSHIONING STRUCTURE

FIELD OF THE INVENTION

This invention relates to a fluid inclusive, composite, cushioning structure in which a plurality of elements are formed to enclose a fluid that is responsive to outside impact forces and to reduce the damaging effects of such forces. More particularly, it relates to structures having pliable cells that are filled with air or other gaseous fluids to cushion impacts, such as air bubble and air bag devices, in which the air compresses under the forces of suddenly applied impact loads to resist the forces, thereby cushioning the load and then is vented in a controlled manner to reduce the rebound of the impacting body.

BACKGROUND OF THE INVENTION

The general problems of damage caused by suddenly applied impact loads are well recognized. Such damages include breakage and destruction of property as well as injury to persons.

Because the occurrence of such impact loads is beyond the control of those who have a need to ship products in commerce by rail, truck, or air and other common carrier transportation, a most common approach to the problem is to provide packaging material and cushioning material in a position around the object in a shipping container to absorb the impacts before they have a damaging effect on the contents being shipped.

In a like manner, persons who are likely to be subjected to impacts either by falling or contact in sports such as football and other "contact" sports often employ cushioning materials in the form of padding to absorb the impacts.

Elderly persons are particularly susceptible to injury, primarily broken bones, through falls and sudden impacts. A major problem for the elderly, who are forming an increasing portion of the population, is susceptibility to broken bones from falls and sudden impacts. Persons of an advanced age find it very difficult to recover from such injuries, and broken hips and joints often lead to complications shortening life.

While numerous materials have been used including paper, granulates, and foams, as padding in the past, the industry has turned to various forms of plastic sheet materials formed in composite structures.

U.S. Pat. No. 3,746,605 - Dillon, et al. shows a cushioning material having a layer of material formed in a plurality of closely spaced cellular protrusions extending from one side and includes restrictive air passages between adjacent cells.

U.S. Pat. No. 3,885,074 Chandler is concerned with a method of thermo-plastic polymeric resin adhesive deposition or adhesive bonding in which the materials are slit or cut before heating to cause the film to assume a pattern directly related to the arrangement or slits. A hexagonal pattern is one of the forms that is obtainable by this method.

U.S. Pat. No. 3,900,356 Koch, et al. shows apparatus and a method for producing a cellular cushioning structure. A gaseous fluid under pressure is contained between the outer films of materials. The pressure of the gas is greater than atmospheric to cause the soften plastic to expand and create cells of super atmospheric pressured gas.

U.S. Pat. No. 4,096,306 Larson reveals a method of making a cushioning material having "bubbles" of super atmospheric gas such as air. The cushioning material is inflatable by passages from one cell to the next.

U.S. Pat. No. 4,287,250 Rudy reveals a packaging and/or cushioning product wherein chambers are inflated initially with a gaseous medium comprising a gas other than air, oxygen or nitrogen which has a very low diffusion rate from each chamber through the sheet material from which the product is formed.

U.S. Pat. No. 4,427,474 Ottaviano reveals a method for the production of air cell cushioning material, with the air cell product being formed from a flexible single stratum sheet of low density, low melting point thermoplastic such as polyethylene film.

U.S. Pat. No. 4,551,379 Kerr shows still another configuration of cushion material having inflatable passages formed between juxtaposed sheets with adjacent passages being separated by partitions. In one aspect the passages are sinuous so that a plurality of restrictions are preformed along the length to restrict the flow of air. In another aspect, discontinuities are formed in the partitions to allow restrictive air flow from one passage to another.

Because packing materials add to the weight and volume of the freight and objects being shipped, lightweight and compactness are objective features addressed by the prior art as well as many of the products presently in use. However, such objectives should be ideally sought without a reduction in the performance of the material. It is an object of the present invention to achieve a maximum capability for the absorption of impact and energy imparted to the material by the forces impacting on the structure with a minimum energy available for rebound. It is a further object to provide an improved ratio of material usage, material cost, and energy absorption by means of the unique form and geometrical shapes of the elements in the structure and their relation to each other. While prior practitioners have used some of the form and features of the present invention their unique combination presented herein has not been previously taught.

Although the prior art addresses many of the relevant factors that bear on the construction of an improved cushioning structure, none teach the unique form found in the cushioning structure of this invention.

SUMMARY OF THE INVENTION

In summary, this invention is a cushioning structure for dampening shocks comprising one or more planar stratum or sheets of pliable material having a plurality of cell structures bonded and sealed thereto with each cell structure comprising a polygon including a plurality of walls in upstanding relationship to the plane of the stratum. Each cell is closed and sealed at each end, with at least one end being one stratum, so that each cell structure comprises a sealed enclosure having a fluid therein. Each cell is connected to adjacent cells by way of a restricting airway that acts as a valve which can be varied during fabrication by adjusting the ratio of the cell volume to the cross-section of the connecting airway cross sectional area.

In a preferred embodiment, the structure includes two sheets of plastic material such as polyethylene or polyvinylethylene of a thin pliable compounding composition, with hexagonally shaped cells that are bonded to an overlay second sheet in such a way as to permit controlled airflow between adjacent cells. With the proper spacing of the hexagonal cells, two of the described assemblies can be meshed or mated together with the inside cells of one assembly nesting into the spaces between the cells of the second assembly. The cell walls are bonded to the outside sheets and communication means are provided between adjacent cells so that the air or gas may pass from one cell to the next when an impact force strikes a localized area on the surface of the structure and the air is restricted or slowed from re-entering the original cell in order to reduce the normal rebound.

Appropriate selection of material, wall thicknesses, and the connecting cross-sectional areas between the cells, provides the means for optimizing the performance of the structure in absorbing the energy of impact that is delivered to the surface of the material while minimizing the amount of rebound from the structure. By using an appropriately selected combination of different connecting cross-sectional areas throughout the structure, the resistance to different kinds and quantities of impacts can be provided to produce the desired deceleration.

The foregoing and other advantages of the invention will become apparent from the following disclosure in which preferred embodiments of the invention are described in detail and illustrated in the accompanying drawings. It is contemplated that variations and structural features and arrangement of parts may appear to the person skilled in the art, without departing from the scope of sacrificing any of the advantages of the invention which is delineated in the included claims.

BRIEF DESCRIPTION OF THE DRAWINGS

FIG. 4A is a partial plan view of another embodiment of this invention.

FIG. 4B is a partial elevational section view taken on the line 4B—4B of FIG. 4A.

FIG. 5 is a sectional elevation view of another embodiment of the invention.

FIG. 6 is a partial elevational section view of another embodiment of this invention.

FIG. 7 is a partial schematic sectional perspective view of a portion of another embodiment of the structure of this invention.

DETAILED DESCRIPTION OF A PREFERRED EMBODIMENT OF THE BEST MODE OF CARRYING OUT THE INVENTION

The structure of this invention indicated generally as 19 includes an upper stratum or sheet of pliable material 20, and a lower stratum or sheet of pliable material 21 separated by a matrix of hexagonal, hollow three-dimensional polygon members 22 in juxtaposed or contacting relationship one to the next.

Figure 1:
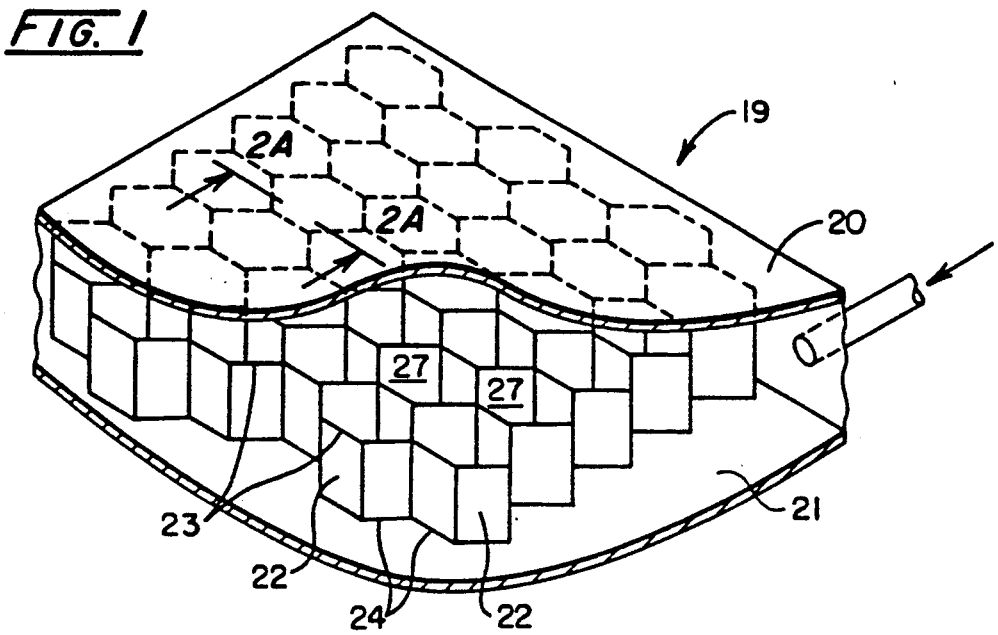
FIG. 1 is a partial schematic sectional perspective view of a portion of the structure of this invention.
Figure 2A:
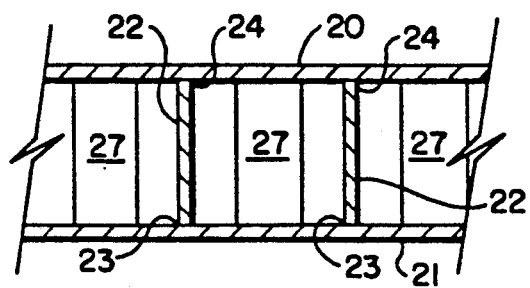
FIG. 2A is a partial elevational section view of the structure on the line 2A—2A of FIG. 1.

As shown in FIG. 1 and 2A, the cell members 22 are of hexagonal shape in cross-sectional plan. In the finally assembled condition the edges 23 of the individual hexagonal cells 22 are bonded to the top stratum 20 and bottom stratum 21 at edges 23 and 24 at one side and at edges 24 at the opposite side, respectively. The bond formed at the edges 23 and 24 is a substantially hermetically sealed connection so that in the assembled condition the matrix includes a plurality of generally hexagonal cells 27 separately sealed one from the next, except as specifically otherwise provided and as hereafter defined.

Since the materials are heat sealable the various seals described herein may be accomplished by conventional heat sealing means. Adhesive could also be use.

The structure 19 is hermetically closed at the periphery by a closure means 26 and an inlet 25 is provided for the admission of a fluid such as air or other gas which may be at a pressure above surrounding atmosphere or environment in which the structure is placed. The structure 19 is constructed of generally pliable materials, usually plastics, including vinyl and/or polyethylene type films.

Dimensionally it is conceived that the structure 19 could be between about 1 and 30 centimeters "thick", i.e. the distance from the outside of one stratum to the other. The thickness of the sheet materials from which the strata 20 and 21 and matrix cells wall elements 22 are formed may be between about .01 and 100 mills.

In the embodiment shown in FIGS. 1 and 2A the matrix cells comprise hexagonal polygons. Such shape has been chosen because of the unique form of a hexagon that permits complete nesting of the vertical surfaces of the cell one to the next. Nevertheless, other forms of polygons may provide the advantages of this invention and are to be considered as within the concepts worthy of further evaluation and usefulness in the application of the principles that are embodied in the structure 19.

Figure 2B:
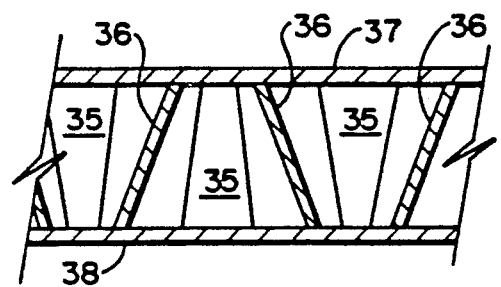
FIG. 2B is a partial elevational section view of another embodiment of this invention from the same position as FIG. 2A.

For instance, the contacting wall between polygons may be sloped rather than vertical providing tapered or truncated polygons, rather than rectangular polygons as shown in FIG. 1. FIG. 2B shows tapered polygons as an example. In this embodiment a plurality of cells 35 have substantially upstanding sides 36 bonded to an upper planar sheet like stratum 37 and a similar lower stratum 38.

Figure 3A:
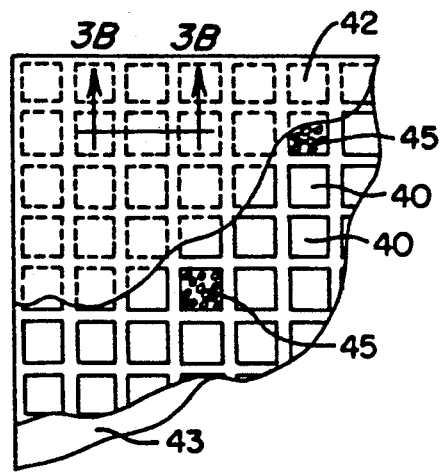
FIG. 3A is a partial schematic sectional plan view of a portion of another embodiment of the structure of this invention.
Figure 3B:
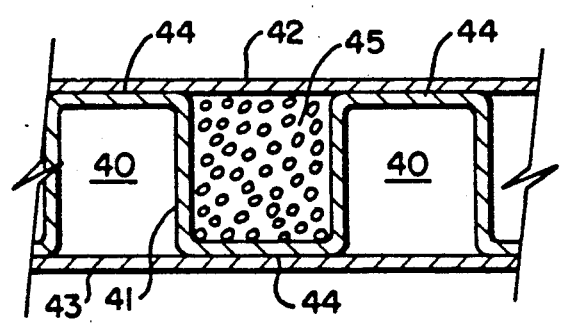
FIG. 3B is a partial elevational section view of a portion of the structure taken on the line 3B—3B of FIG. 3A.

Four sided polygons or cubes are representative of another polygon configuration that may be useful in some circumstances, as seen in FIGS. 3A and 3B.

In this embodiment a plurality of cells 40 are cube-like rectangles, formed or molded into an internal core member 41. Core member 41 is bonded to an upper sheet 42 and a lower sheet 43 at positions of contact 44.

Still other forms of polygons are within ready conception, for instance, pentagons or cones.

Referring to FIGS. 4A and 4B a structure 50 includes an upper stratum 51 to which is bonded a lower cellular matrix 52 on which is formed a plurality of downstanding/upstanding truncated polygon cells 53 selectively arranged in mutually supporting and equally load distributing relationship across the surface of the stratum 51.

In another aspect of this invention as shown in FIG. 5, a passage way conduit or aperture 30 is provided from a polygon to each of the adjacent cells through which the fluid is conducted to pass from one cell to the next. By the proper selection of the size of such conduits, the rate of fluid flow may be controlled and serve to "valve" the rate of the fluid passage from one cell to the next. Such conduits 30 may be provided by allowing unbonded areas between the end of a cell 60 and the stratum 61. This controlled venting of the compressed air spring within the impacted cell serves to maximize the absorption of the impact energy while minimizing the energy available for rebound. The difference in pressure between the impacted and the unimpacted, adjacent cells aids the controlled reinflation of the impacted cell in order the provide protection from repeated impacts.

In the embodiment of FIG. 5, an internal matrix structure 60 is sandwiched between an upper stratum 61 and a lower stratum 62 and bonded there between at the surfaces 63 and 64.

Referring to FIG. 5, the internal matrix structure 61 is provided with substantially upstanding walls that may also be designed to provide a one-way valve-like apertures 32 between the walls of two mating hexagonal structures that aids the reduction of rebound energy. The apertures 32 open upon an impact due to the columnar buckling of the cell walls and pass fluid from the impacted area to adjacent areas when the pressure on the one side increases to a valve higher than the pressure on the other side. When the pressure equalizes during the structural rebound, the resilience of the material in the member 61 causes the valved opening to close or partially close thereby restricting the reverse flow by allowing the pressure to gradually equalize.

Figure 7A:
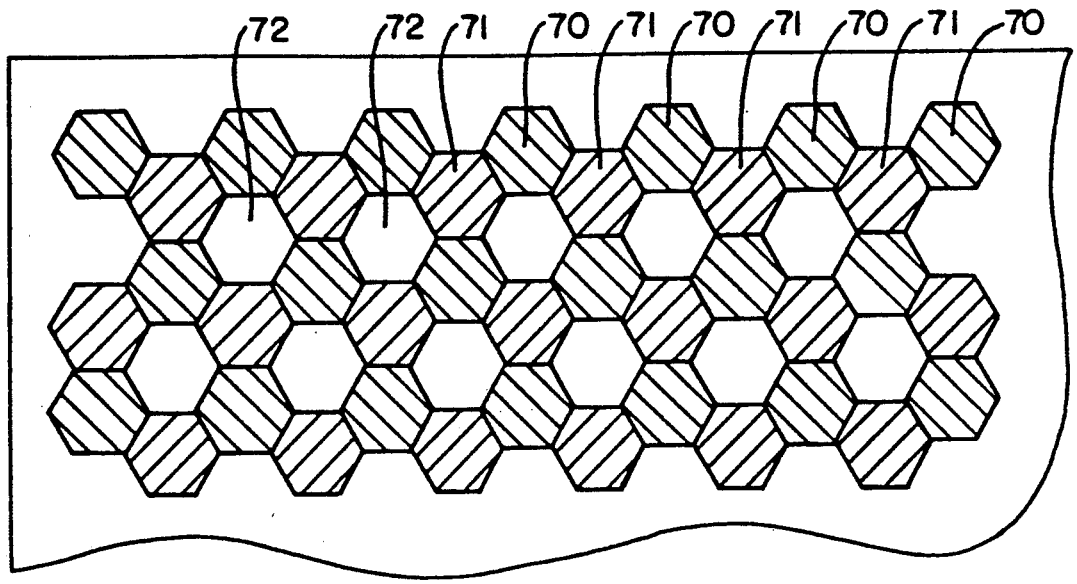
FIG. 7A is a schematic layout of the organization of the cells in the embodiment shown in FIG. 7.
Figure 8:
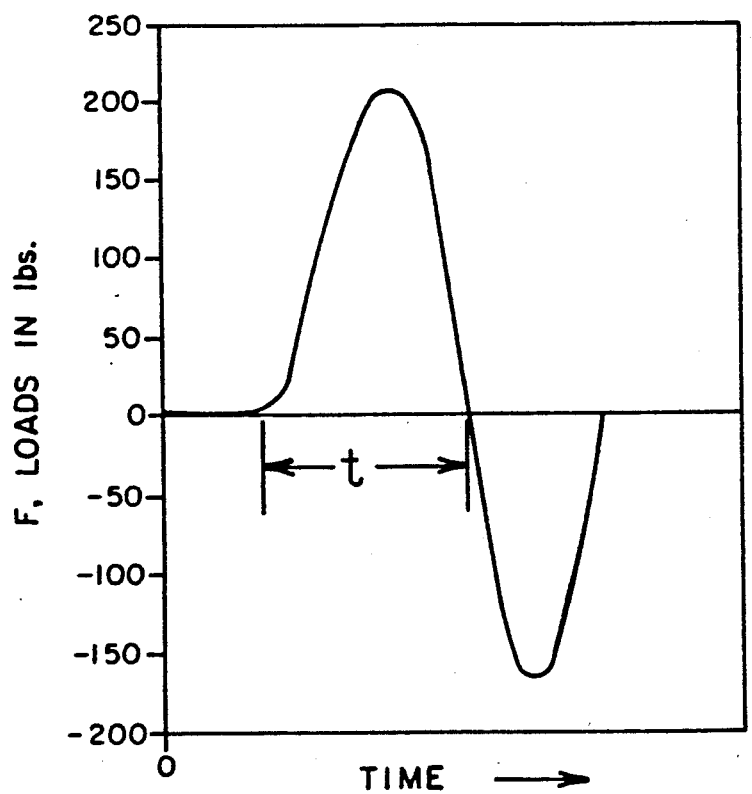
FIG. 8 is a typical load vs. time chart representative of an impact load upon an undamp cushioning structure.
Figure 9:
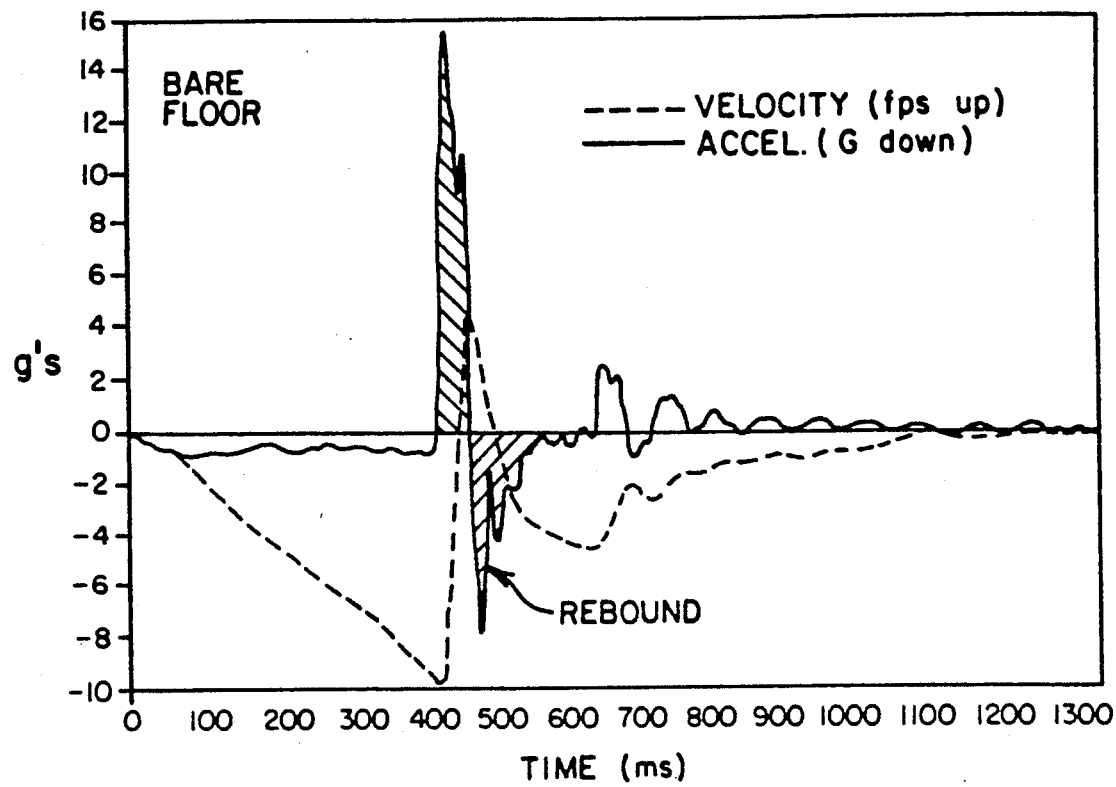
FIG. 9 is a graph showing the velocity and acceleration imparted to a test specimen in a standard test when no cushioning structure is provided between a bare floor and the specimen.
Figure 10:
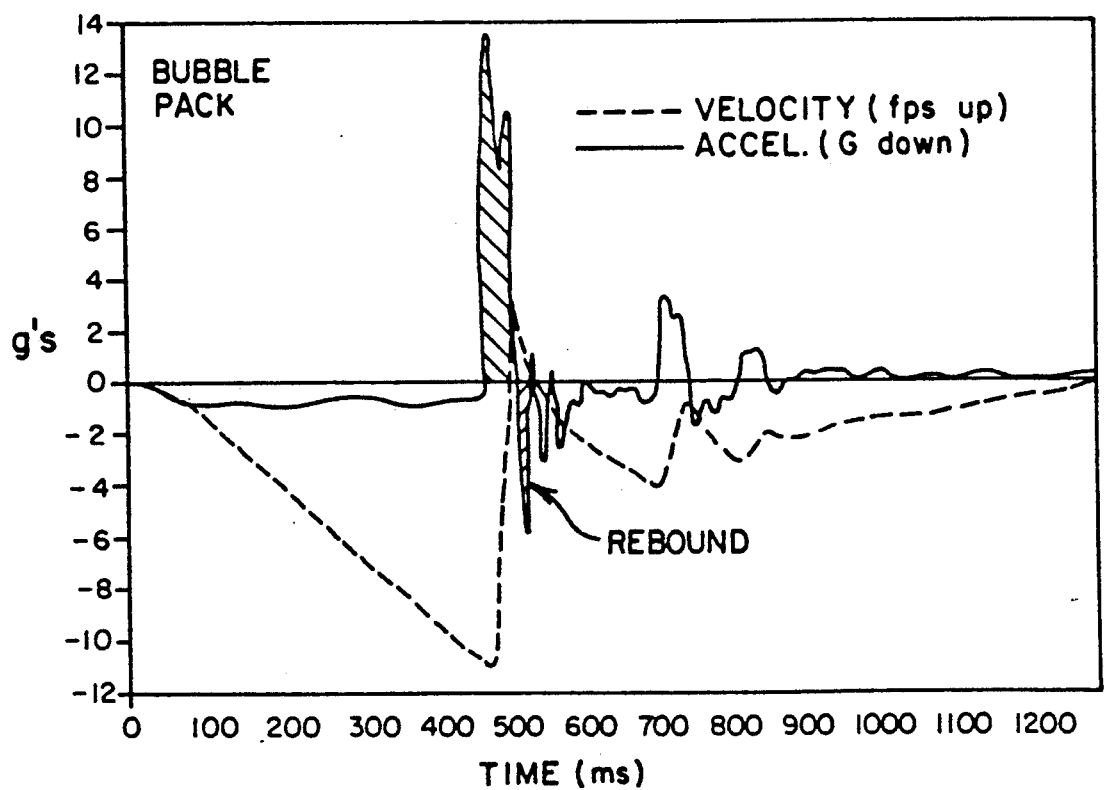
FIG. 10 is a graph showing velocity and acceleration imparted to a specimen dropped 36 inches upon a cushioning structure of 1 inch thick conventional commercial bubble pack.
Figure 11:
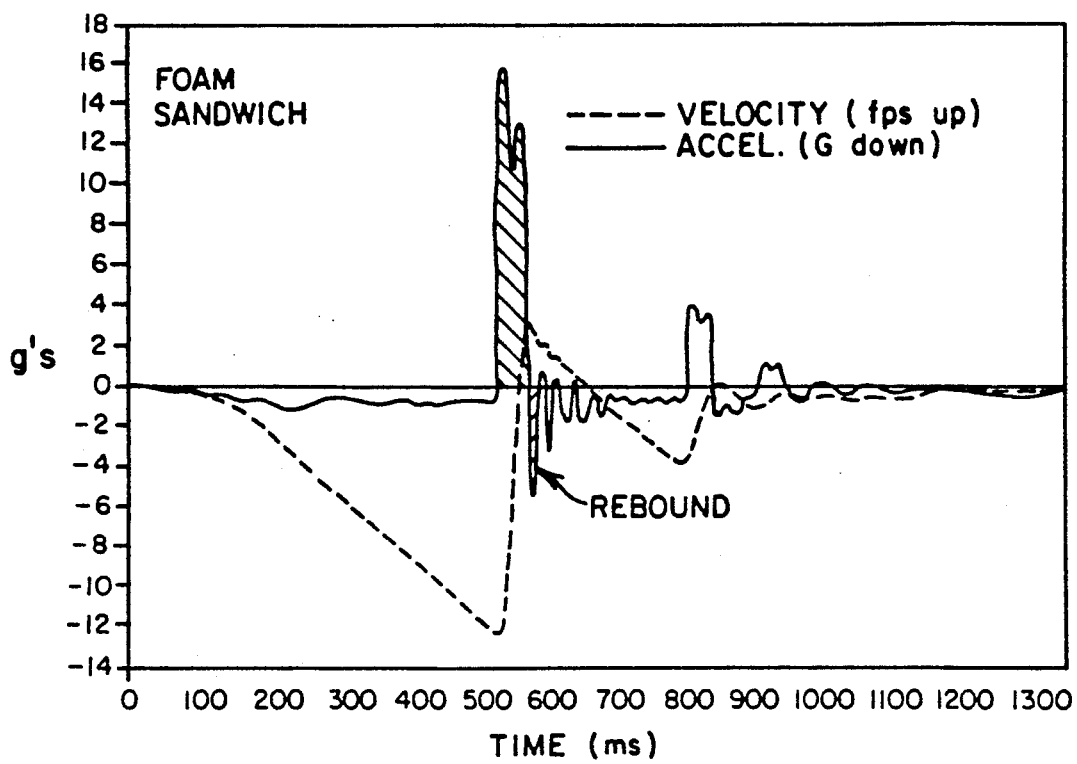
FIG. 11 is a graph showing velocity and acceleration of a specimen that was dropped 36 inches upon a conventional sandwich structure of dense elastic foam.
Figure 12:
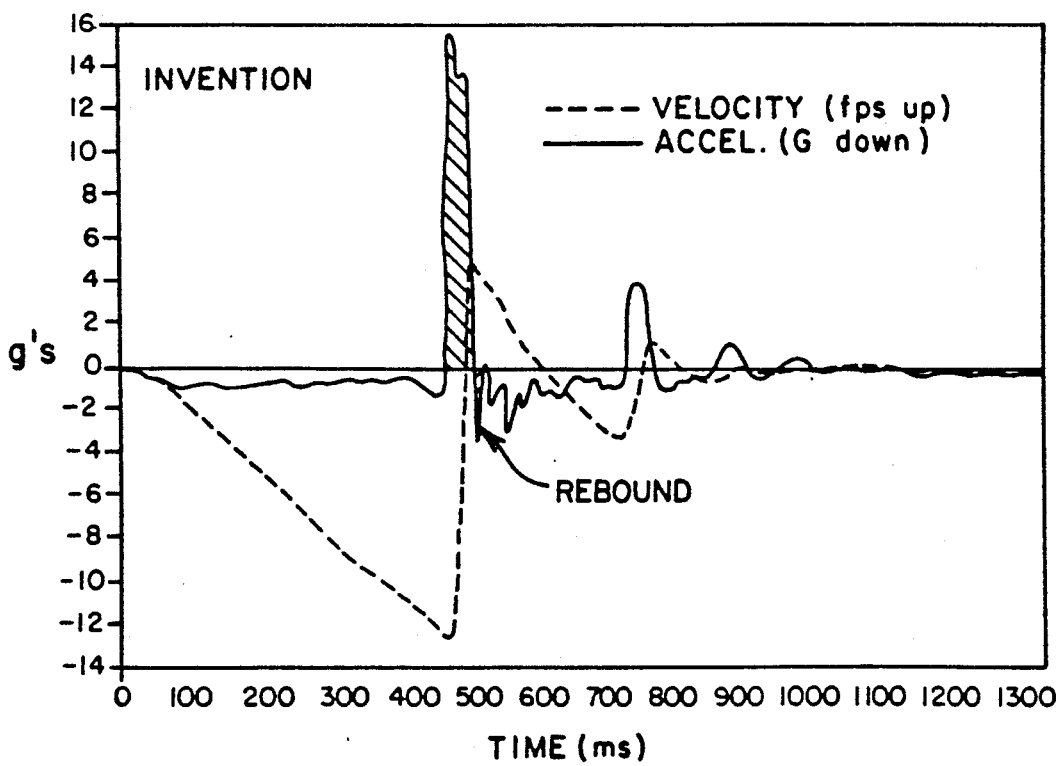
FIG. 12 is a graph showing velocity and acceleration of a specimen dropped upon the prototype cushioning structure of this invention from a height of 36 inches.

Referring to the FIGS. 6, 7 and 7A, in a further embodiment of the invention, separate substructures, indicated generally as 70 and 71 and constructed in accordance with the embodiment shown in FIGS. 4A and 4B, are brought together as shown by the arrows in FIG. 6 to form a composite structure 73. When so assembled the polygon cells of substructure 70 (See FIG. 7A) mate with polygon cells of substructure 71 leaving a plurality of empty cells 72.

In the assembled position as shown in FIG. 7 the composite structure 73 comprises an upper stratum 74, internal cell polygons 75, shown as truncated prismatic in shape because of the inherent columnar structural strength of such configuration, of the upper substructures 70, and internal polygon cells 76, of matching configuration to the polygons 75, of the lower substructure 71, as well as lower stratum 77. Channels 80 of the upper substructure 70 and channels 81 of the lower substructure 71 provide the valving action and dampening action in composite structure 73.

By means of a combination of the columnar buckling of the supporting hexagonal walls, the restricted airflow through the connecting passages between the cells, and the valved airflow between mating structures, the rate is controlled at which the force of impact on the surface of the structure is dissipated throughout the structure and the energy available for rebound is minimized.

In use, structures 19, 50 and 73 are placed external to a fragile body or between a wall such as the side of a shipping carton, and an object such as a product to be shipped in commerce. It may be expected that the object will encounter sudden loads and impacts during the course of its shipment to its destination. Such impacts produce sudden loads on one side of the structure 19 and forces are created against one side stratum, which depend upon the amount of force and the area of the object that inputs on the surface. The reaction created in the structure 19 responds to the impact load by compressing the fluid through lateral pressure forces radiating from the place of impact from one cell to the next to disperse the load and reduce the force at a rate which prevents damage to the object.

In an alternative situation, the structure 19 may be formed as wearing apparel or padding for the projecting and more fragile components of a persons body. If the padding were worn as a pants or skirt about the hips of a person, and the person falls, the protruding hip joints are a load to which the structure 19 reacts.

Because of its unique construction and the lateral dispersal of the impact load, it has been found that the energy absorption of this structure exceeds prior art apparatus tested that are in use for these purposes. In actual tests the energy absorption has been found to be 30-100% higher than such packing materials as "bubble packs" or foam materials such as rubber or plastic foam materials that are presently in the marketplace for this purpose.

Referring again to FIG. 3A and 3B, in still another aspect of the invention, selected numbers and positioned cells are filled with foam type materials 45 to provide a further parameter of dampening attenuation and energy absorption reaction to the load as well as the restoration or recovery of the cushioning structure to its original or preimpacted state.

It is believed that the further enhancement of the surprisingly outstanding results are provided by the damping by the fluid as its flow is restricted to adjacent cells, by the valve action between the mating hexagonal structures, and the strength and controlled columnar buckling produced by a the crumpling of the inherently strong polygon structures.

A prototype cushioning structure as shown in FIG. 7 according to this invention was constructed and tested in comparison with other well known cushioning materials such as commercially available bubble pack, which is a connected plurality of semi-spherical air cells similar to that shown in U.S. Pat. No. 4,287,250, and a foam sandwich comprising two layers of foam, manufactured by Dynamic Systems, Inc. In these tests an object in the shape of a manikin head weighing 7 pounds was dropped from a distance of 36 inches upon a structure as defined in Table I which is representative of the results.

TABLE I

FORCE-IMPULSE AND RESTITUTION

| FIG. No. | Test No. | Fall Description | Acceleration Peak to Peak g's | lb-sec | Impulse e'- Restitution Coefficient (Energy Difference Impactless Rebound) |
|---|---|---|---|---|---|
| 9 | 49 | Bare Floor | 360 | 282.3 | .65 |
| 10 | 72 | Bubble Pack | 360 | 321.5 | .5 |
| 11 | 65 | Foam Sandwich | 375 | 335.8 | .58 |
| 12 | 74 | Invention | 220 | 371.2 | .46 |

In Table I "peak to peak" is the value in g's ft/sec$^2$, per 32 ft/sec$^2$ of maximum force in one cycle from first impact to rebound.

The impulse is the force x time in pounds/second and the restitution coefficient is the percent of rebound between the first impact and the first rebound. It is to be emphasized that the prototype unit was much lighter (25% of the density or weight of the sandwich foam) and only half its thickness. The packaging density of the invention is also significantly higher than conventional bubble pack, i.e. the material is molded into the series of hexagonal cells to provide a high strength/weight ratio and still can be easily sealed. Since the internal strength of the dividing members can be varied, the invention can also be made to support practically any weight and still provide good shock absorption protection—a feature of great importance to the shipping and packaging industry. This structure is also compatible with traditional vacuum molding technology and thus is relatively inexpensive to mass produce. It is therefore apparent that there are significant commercial improvements in his cushioning structure as a lightweight, low bulk, high performance packaging material for shipping.

Further evidence of the improved energy absorption of this invention in comparison with other cushioning materials tested is shown in FIGS. 7–11, in which the area under the neutral axis "zero" for the invention and the depth of penetration of the rebound, as shown by the first rebound envelope (cross-hatched below the neutral axis) is drastically reduced in comparison with the other materials.

TABLE II

HEAD DROP ENERGY CALCULATIONS

| FIG. No. | Description | G Avg | G Peak | Vi$^2$ | Vr$^2$ | $\frac{Vi^2}{Vr}$ | KE Diff | Freq |
|---|---|---|---|---|---|---|---|---|
| 9 | Bare Floor | 9.71 | 15.45 | 198 | 106 | 1.87 | 9.93 | 4.57 |
| 10 | Bubble-Pack | 8.98 | 13.45 | 169 | 45 | 3.76 | 13.39 | 4.22 |
| 11 | Foam Sandwich | 10.85 | 16.15 | 269 | 48 | 5.6 | 23.87 | 3.62 |
| 12 | Invention | 11.13 | 15.64 | 308 | 64 | 4.81 | 26.35 | 3.62 | where m = 7/32.2 = .217 slugs
Vi = Velocity of Impact
Vr = Velocity of Rebound $$\frac{(KE)}{(DIFF)} = \frac{m}{2} (Vi^2 - Vr^2) \text{ ft-lb}$$

Further testing was conducted by GH Package/Product Testing and Consulting, Inc. of Cincinnati, Ohio according to standard ASTM (American Society of Testing Materials) criteria. In these tests the structure was subjected to vibration and impact shock testing to determine its viable characteristics as related to packaging. The vibration testing encompassed a 0.5 g input sign wave sweep with the cushioning structure of the invention loaded with incremental loadings from 0.11 psi to 0.17 psi. The results indicated a very low transmissibility characteristic to all testing frequencies with all loads. This characteristic for packaging protection is extremely beneficial in vibration protection since shifting psi loadings can be costly by requiring more cushioning material thereby increasing the volume and cost. Also, when wrapping material, the uniform vibration characteristics take place no matter what the results of loading in psi. In comparison to the vibration responses of a double thickness of bubble pack the cushioning material of this invention performs lower in transmissibility and much more consistent on all loads and frequencies.

The shock resistance characteristics produced by one thickness of the cushioning structure of the invention was typically greater than that generated by two thicknesses of conventional bubble pack. This was true across the various increased loadings that were impacted on the material.

Another important characteristic noted was that after the initial shock and rebound, the impact load incurred almost no additional secondary rebounds or almost negative g's. This indicates that a product which is packaged in the cushioning structure of this invention will not incur successive aftershock which may be more than damaging to sensitive products than the initial impact even though the initial impact g's may result in larger amplitudes.

Since the structure is more "efficient" (i.e. energy absorbing per unit of thickness) it would be useful in various other applications such as life jackets, baseball catcher protection, hockey equipment, football helmets, shoulder and chest protectors and seat cushions.

The prototype of the invention was constructed to provide both a fast response and well regulated collapse while preventing the "bottoming out" of the structure. The invention presents a new and novel concept of distributed air cell venting and the controlled deformation of its internal structural members. Because of this combination, the wall thickness of the structure can be constructed to withstand a wide range of selected pre-loading. The pre-loading of the prototype unit was established to provide for less than ten pounds without premature collapse. This may be selectively increased in other cushion structure by increasing the wall thickness of the cells. The energy absorption and rebound is regulated by the ventilation rate of the structure.

It has been deemed important that the invention includes the ability for mass production and low cost. It is herein understood that although the present invention has been specifically disclosed with the preferred embodiments and examples, modifications and variations of the concepts herein disclosed may be resorted to by those skilled in the art. Such modifications and variations are considered to be within the scope of the invention and the appended claims.

We claim:
1. A cushioning structure operable to dampen shocks upon a surface thereof when placed in a surrounding atmosphere through which sudden loads are imposed and to absorb the energy of said shocks and retard the transmission of said shocks to a surface or object upon which the conditioning material is placed, comprising:
   a. a plurality of planar strata of pliable material having a plurality of cell structures bonded and sealed between the strata with each cell structure comprising a polygon, and with the cell structure including a plurality of polygons of pliable material in substantially upstanding relationship to the planes of said strata, with each cell structure comprising an enclosure having a fluid therein;
b. a fluid communication means being provided between adjacent cells for the transfer of fluid when the pressure in one or more cells is increased as a result of an impact upon the outer surface of a stratum and for the retarded transfer of said fluid by reduction of rebound after said impact;
c. wherein the fluid communication means between the cells is controlled at a preselected rate by valving action of passages for the fluid communication, to provide a preselected rate of dampening for a preselected range of shocks; and
d. wherein selectively spaced and positioned cells are provided internally with a surrounded resilient material to provide further selective dampening effects when an impact load is applied to the structure.

2. A cushioning structure for use in a surrounding atmosphere and for dampening impact shock loads that are suddenly applied, comprising:
a. a plurality of planar strata of pliable material having a plurality of cell structures bonded and sealed therebetween with each cell structure comprising a polygon including a plurality of walls in substantially upstanding relationship to the plane of said stratum and having a closed and sealed end at a position opposite to the planar stratum,
b. with said cell structures comprising a sealed enclosure having a fluid therein,
c. fluid communication means is provided between adjacent cells for the transfer of fluid when the pressure in one or more cells is increased as a result of impact shock loads upon the outer surface of a stratum and the amount of fluid communication between the cells is controlled at a preselected rate by valving action of passages for the fluid communication to provide a preselected dampening for a preselected range of shocks; and
d. wherein selectively spaced and positioned cells are internally provided with a surrounded resilient material to provide further selective dampening effects when an impact load is applied to the structure.

3. A cushioning structure for use in a surrounding atmosphere and for dampening shocks that are suddenly applied, comprising:
a. at least one planar stratum of pliable material having a plurality of cell structures bonded and sealed thereto with each cell structure comprising a polygon including a plurality of walls in substantially upstanding relationship to the plane of the stratum and having a closed and sealed end at a position opposite to the planar stratum,
b. with said cell structure comprising a sealed enclosure having a fluid therein,
c. fluid communication means provided between adjacent cells for the transfer of fluid when the pressure in one or more cells is increased as a result of impact upon the outer surface of a stratum and the amount of fluid communication between the cells is controlled at a preselected rate by valving action of passages in the fluid communication means to provide a preselected rate of dampening for a preselected range of shocks,
d. said communication means comprising lateral channels formed of the pliable material and communicating at each end with a cell, and
e. with the cross-sectional area of the channels providing the controlled valving action of the passages for the fluid communication.

4. A cushioning structure operable to dampen sudden shocks loads imposed from a surrounding atmosphere upon a surface thereof, to absorb the energy of said shocks loads and retard the transmission of said shocks to a surface or object upon which the cushioning material is placed and to retard the rebound of the shock load upon the structure, comprising:
a. a plurality of planar strata of pliable material spaced apart and connected by a plurality of formed substructures;
b. each substructure comprising a formed pliable material including a planar portion and a plurality of walls in substantially upstanding relationship to the planes of the substructure planar portions, with each polygon formed in a truncated, prismatic, hexagonal, shape having an end of smaller cross-sectional area and an end of larger cross-sectional area;
c. with the hexagonal, truncated, prismatic polygons of one substructure mating with the congruent polygon shapes of another substructure to provide an assembly comprising an upper stratum, a plurality of internal cell polygons of the upper substructure and a plurality of internal polygon cells of a lower substructure and a lower stratum;
d. the composite structure being joined as a completely interconnected unit by bonding at contact surfaces of the stratum and substructures;
e. each internal hexagonal cell polygon being in communication with an adjacent hexagonal cell polygon at the position of a larger cross-sectional area of the channel means formed in the connecting plane portion of the substructure; and
f. the cross-sectional area of the channel means being selected to provide a valving action for the passage of fluid from one polygon cell to the next at a preselected rate to provide a preselected rate of dampening for a preselected range of shocks.

5. A cushioning structure according to claim 4 wherein the number of polygon cells in the combination of assembled, mated substructures leaves a plurality of empty cells formed by the walls of the polygon cells of the substructures.

6. A cushioning structure according to claim 5 wherein selectively spaced and positioned cells are provided internally with a surrounded resilient material to provide further selective dampening effects when an impact load is applied to the structure.

* * * * *